(No Model.)

G. W. FOSTER.
MACHINE FOR PREPARING LINT AND OTHER SIMILAR FIBERS.

No. 425,874. Patented Apr. 15, 1890.

WITNESSES:
Edward Wolff.
William Miller

INVENTOR:
George W. Foster.
BY
Van Santvoord & Hauff
ATTORNEYS

UNITED STATES PATENT OFFICE.

GEORGE W. FOSTER, OF PORT CHESTER, ASSIGNOR OF FORTY-FIVE ONE-HUNDREDTHS TO THOMAS C. BOOTH, OF NEW YORK, N. Y.

MACHINE FOR PREPARING LINT AND OTHER SIMILAR FIBERS.

SPECIFICATION forming part of Letters Patent No. 425,874, dated April 15, 1890.

Application filed September 13, 1889. Serial No. 323,360. (No model.)

*To all whom it may concern:*

Be it known that I, GEORGE W. FOSTER, a citizen of the United States, residing at Port Chester, in the county of Westchester and State of New York, have invented new and useful Improvements in Machines for Preparing Lint and other Similar Fibers, of which the following is a specification.

This invention relates to a machine adapted to prepare lint; and it consists in the details of construction set forth in the following specification, and claimed and illustrated in the accompanying drawings, in which—

Figure 1:
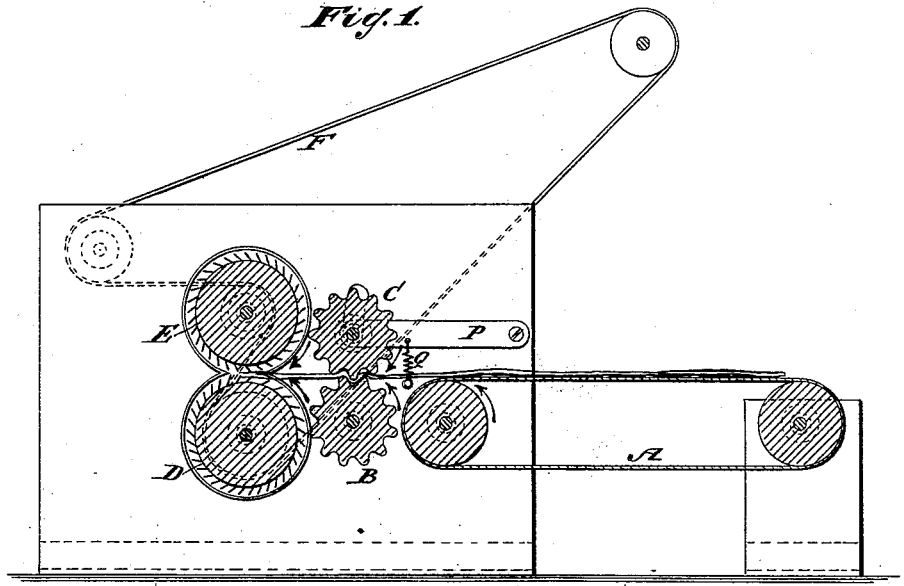
Figure 2:
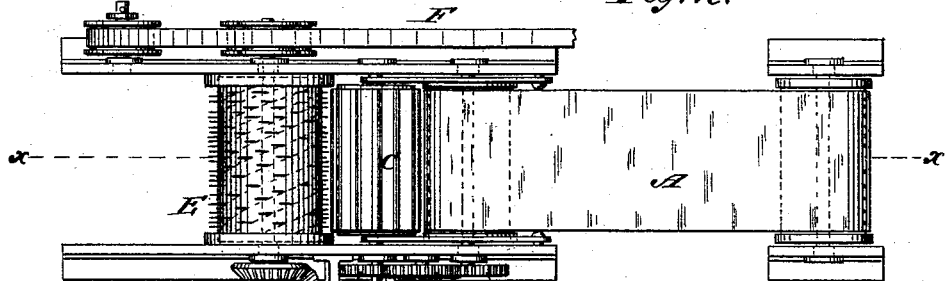
Figure 3:
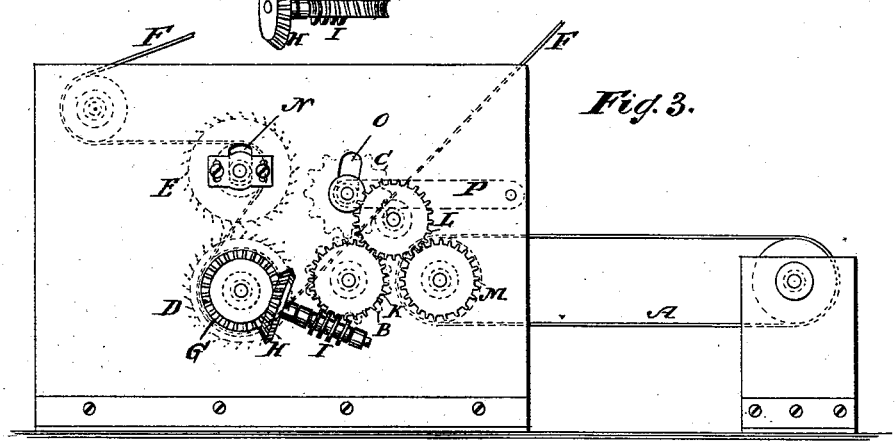

Figure 1 is a longitudinal section along line $x$ $x$, Fig. 2, of a machine for preparing lint. Fig. 2 is a plan view of Fig. 1, and Fig. 3 is a side elevation of Fig. 2.

Similar letters indicate corresponding parts.

In the drawings, the letter A indicates a belt, which serves as a feeding device for feeding the flax or fibers to the bending or breaking rollers B C. These rollers B C have corrugations which bend or break the flax, so as to make it soft and easily operated on. From the breaking-rollers the flax passes between the drums D E, one of which—say the drum E—is made to turn at a higher rate of speed than the other. These drums have teeth inclined in a direction opposite to the direction of rotation of the drums, so that the teeth do not pierce the flax, but enter the flax with a draw cut. The drum E, moving at a higher rate of speed than the drum D, will draw the flax onto the teeth of the drum D, whence it can be readily removed by fanning, blowing, or brushing, or by the rotation of the drum D. Motion can be imparted to the drums by suitable means, such as a belt F. By providing one of the drums with a bevel-gear G motion therefrom can be transmitted through bevel-gear H and worm I to the gear-wheels K L M. The wheel K actuates the breaking-rollers B C and the wheels L M actuate the feeding device A.

The drum E can be made adjustable, slots N in the supporting-frame allowing the said drum E to be set nearer to or farther from the drum D. A slot or slots O allow play to the roller C, mounted on the swinging arm P, said arm P being drawn by a spring Q, so as to hold the roller C close to the roller B.

The teeth on the drums D E can be arranged in spiral lines, as seen in Fig. 2. The rollers B C can be made to rotate at a greater or less rate of speed, as may be desired. By increasing the rate of speed of the rollers B C and retaining or decreasing the speed of the drums D E the length of the fibers drawn by the drums will be increased.

What I claim as new, and desire to secure by Letters Patent, is—

1. The combination, with a feeding device and bending or breaking rollers, of two oppositely-revolving drums made to revolve at different rates of speed and having teeth extending from their peripheries, said teeth being inclined in a direction opposite to the direction of motion of the drums, substantially as described.

2. The combination, with a feeding device and bending or breaking rollers, of two oppositely-revolving drums made to revolve at different rates of speed and having teeth extending from their peripheries, said teeth being spirally arranged about the drums and being inclined in a direction opposite to the direction of motion of the drums, substantially as described.

In testimony whereof I have hereunto set my hand in the presence of two subscribing witnesses.

GEORGE W. FOSTER.

Witnesses:
 W. C. HAUFF,
 E. F. KASTENHUBER.